United States Patent [19]
Divan et al.

[11] Patent Number: 5,402,053
[45] Date of Patent: Mar. 28, 1995

[54] SINGLE PHASE TO THREE PHASE CONVERTER CAPABLE OF VARIABLE SPEED MOTOR OPERATION

[75] Inventors: Deepakraj M. Divan; Donald W. Novotny; Chingchi Chen, all of Madison, Wis.

[73] Assignee: Wisconsin Alumni Research Foundation, Madison, Wis.

[21] Appl. No.: 112,609

[22] Filed: Aug. 26, 1993

[51] Int. Cl.⁶ .......................................... H02M 5/293
[52] U.S. Cl. .................... 318/768; 318/778; 318/785; 318/801; 363/49
[58] Field of Search ............ 318/798, 785, 778, 801, 318/768, 779, 781, 782, 785, 786, 787, 100; 363/37, 49, 148, 3, 4, 9, 36

[56] References Cited

U.S. PATENT DOCUMENTS

| | | |
|---|---|---|
| 3,522,502 | 8/1970 | Tuchen . |
| 3,527,995 | 9/1970 | Lee et al. . |
| 4,060,754 | 11/1977 | Kirtley, Jr. et al. . |
| 4,618,809 | 10/1986 | Maeda . |
| 4,642,544 | 2/1987 | Lewus ................................. 318/785 |
| 4,719,550 | 1/1988 | Powell et al. ........................ 363/37 |
| 4,899,268 | 2/1990 | Hollinger . |
| 4,910,450 | 3/1990 | Parker et al. ....................... 318/798 |
| 5,017,800 | 5/1991 | Divan . |
| 5,272,616 | 12/1993 | Divan et al. . |

FOREIGN PATENT DOCUMENTS 60-245471 12/1985 Japan .
2111326 6/1983 United Kingdom .

OTHER PUBLICATIONS

C. Chen, et al., "A single Phase to Three Phase Power Converter For Motor Drive Applications," IEEE IAS Conf. Record, 1992, pp. 639-646.

S. B. Dewan, et al., "Steady-State Analysis of Static Single-Phase to Three-Phase Converters," IEEE IAS Conf. Rec., 1981, pp. 910-915.

S. K. Biswas, "A New Static Converter For The Operation of Three-Phase Motors on Single-Phase Supply," IEEE IAS Conf. Rec., 1986, pp. 1550-1554.

S. I. Khan, et al., "A Novel Single to Three Phase Static Converter," IEEE IAS Conf. Rec., 1987, pp. 658-665.

L. H. Soderholm, et al., "Automatic Balance of Three–

(List continued on next page.)

Primary Examiner—Jonathan Wysocki
Assistant Examiner—John W. Cabeca
Attorney, Agent, or Firm—Foley & Lardner

[57] ABSTRACT

A converter, for providing three phase power to a three phase induction motor from a single phase supply, includes an inverter connected to the single phase input power lines which has two switching devices, and a bi-directional switch connected between one of the single phase input power and one output line to the motor. The other two outputs provided to the motor are a direct connection from the other AC input line and the output of the inverter. In a first or start-up mode of operation, the bi-directional switch and the inverter are controlled to provide currents to the motor which are at a fundamental frequency lower than the single phase AC input frequency to provide controlled start-up of the motor with limited in-rush current. After the motor has started, the converter may be switched to a second mode wherein the bi-directional switch is turned off and the inverter provides single phase power at increasing frequency to the motor to drive the motor up in speed. In a third mode, where the motor is at or near its rated speed, the hi-directional switch and the inverter may be operated to provide power at the rated frequency to the motor, but at variable and controllable voltage levels to control the speed of the motor. In a fourth mode, at or near the rated speed of the motor, the bi-directional switch is controlled to conduct constantly, and the inverter is operated to provide balanced three phase voltages to the motor. The converter may be implemented with only two switching devices in the inverter and one additional bi-directional switch.

26 Claims, 12 Drawing Sheets

OTHER PUBLICATIONS

Phase Motor Currents for Variable Motor Loading Using a Static Phase Converter," IEEE Trans. on Industry Applications, vol. 26, No. 4, Jul./Aug. 1990, pp. 679–682.

C. Chen, et al., "Simple Topologies For Single Phase AC Line Conditioning," Conference Record, IEEE-IAS Annual Meeting, Oct. 1991, pp. 911–917.

P. Enjeti, et al., "A Low Cost Single Phase to Three Phase Static Power Converter," to be published at IEEE Rural Electronics Conference, May 1992.

Colin Schauder, "Adaptive Speed Identification For Vector Control of Induction Motors Without Rotational Transducers," IEEE IAS Conf. Rec. 1989, pp. 493–499.

P. Enjeti, et al., "Economic Single Phase To Three Phase Converter Topologies For Fixed Frequency Output," IEEE APEC Conf. Rec. 1991, pp. 88–94.

J. Nesbitt, et al., "A Novel Single Phase To Three Phase Converter," IEEE APEC Conf. Rec. 1991, pp. 95–99.

SINGLE PHASE TO THREE PHASE CONVERTER CAPABLE OF VARIABLE SPEED MOTOR OPERATION

FIELD OF THE INVENTION

This invention pertains generally to the field of electrical power conversion systems and particularly to power converters for converting single phase power to three phase power for driving three phase motor loads.

BACKGROUND OF THE INVENTION

Single phase motors, particularly those in the integral horsepower range, typically have lower performance and higher cost than three phase motors. Consequently, where three phase power is available, for applications requiring all but the smallest drive motors, three phase motors are typically used. However, many rural areas of the United States are supplied only with single phase AC power. Thus, farms and other agricultural operations which require electric motor drives have commonly been limited to using single phase motors.

Various solutions have been proposed for converting single phase power to three phase power to allow three phase motors to be utilized where only single phase power is available. Some single phase to three phase converters have been available commercially. Nonetheless, the relatively significant additional cost associated with the single phase to three phase converters has limited the widespread use of three phase motors in agricultural applications.

To minimize costs, it is desirable that the number of power switching elements in a single phase to three phase converter be minimized. Some prior converters which allowed for variable speed drive of induction motors utilized a full rectification of the single phase input power, with at least six switching devices in a full bridge inverter providing the three phase output power. While such systems are effective to provide three phase power to drive motors at variable speed, they have significant cost because of the number of switching devices required, which makes such systems economically impractical for many applications. Single phase to three phase converters have been proposed which utilize as few as two inverter switching elements to provide the third phase input to a three phase motor, with the two single phase input lines directly connected to the other two inputs to the motor. While such systems can be effective and economical, difficulties are encountered during starting of the motor, necessitating an additional large capacitor or capacitors to start the motor and additional switching elements to switch the capacitor out of the circuit after starting. Such two switch inverter circuits typically have not been capable of providing variable speed drive to the motor, but rather only provide balanced three phase output voltages at rated speed of the motor.

SUMMARY OF THE INVENTION

The present invention provides a low cost single phase to three phase converter which is capable of providing controlled starting of three phase induction motors, while limiting in-rush current and providing high starting torques, with efficient operation at a full rated operating speed. In addition, the converter can be operated to provide variable speed operation of the induction motor at speeds below rated speed and, if desired, operation of the motor above rated speed. Only three controlled switches are required to provide the single phase to three phase conversion with full start up capability, eliminating the need for and the cost of start-up capacitors which have conventionally been required in such circuits.

The converter circuit of the present invention has two AC input terminals and input lines connected thereto, and an inverter circuit which preferably comprises a pair of DC bus lines, a pair of capacitors connected across the DC bus lines with a node between the capacitors connected to one of the input lines, a pair of rectifying diodes connected across the DC bus lines with a node connecting the diodes being connected to the other input line, and two controlled switches, such as transistors, which are connected together in series across the DC bus lines. One of the three phase output lines supplying the motor is directly connected to one of the input lines. A second of the input lines is connected through a controllable bi-directional switch, such as a triac or back-to-back thyristors, to a second of the three phase output lines. The third output line is connected to a node between the two switching devices of the inverter.

The converter is capable of being operated in four modes. In a first mode, during start-up of the motor, the bi-directional switch is operated as a single element variable frequency cycloconverter and the inverter is operated as a variable frequency power supply to supply power to the motor at a frequency lower than the single phase AC input power. Very high starting torques can be obtained in this manner to provide start-up of a three phase induction motor, while limiting in-rush current. After start-up, the bi-directional switch can, if desired, be entirely turned off and the inverter operated as a variable frequency power source to drive the three phase motor up in speed in single phase operation. The second mode can also be used to operate the machine above base speed as a single phase motor. In a third mode, at a speed near the rated operating frequency of the motor, the bi-directional switch and the inverter can optionally be operated to provide variable three phase voltage to the motor, and variable torque, so that the speed of the motor can be controlled. In a fourth mode, the bi-directional switch is turned on constantly and the inverter is operated to provide balanced three phase voltages to the motor to drive it at its rated voltage and frequency. In the fourth mode, the balanced output voltages are supplied with virtually no distortion and with very high input power factor.

During the variable speed mode of operation, the harmonic content of the currents and voltages provided from the converter allows ready identification of the motor parameters from the motor terminal voltage and current signals. Sensorless closed loop control may be obtained with appropriate system identification.

The converter of the invention thus provides a very low cost circuit for providing start-up and optional variable speed drive of three phase induction motors from a single phase supply, including the features of high starting torque with low in-rush current, a wide speed range for a majority of loads, operation at full speed with low input distortion and high input power factor, and system identification to allow sensorless speed control.

Further objects, features and advantages of the invention will be apparent from the following detailed description when taken in conjunction with the accompanying drawings.

DETAILED DESCRIPTION OF THE INVENTION

Figure 1:
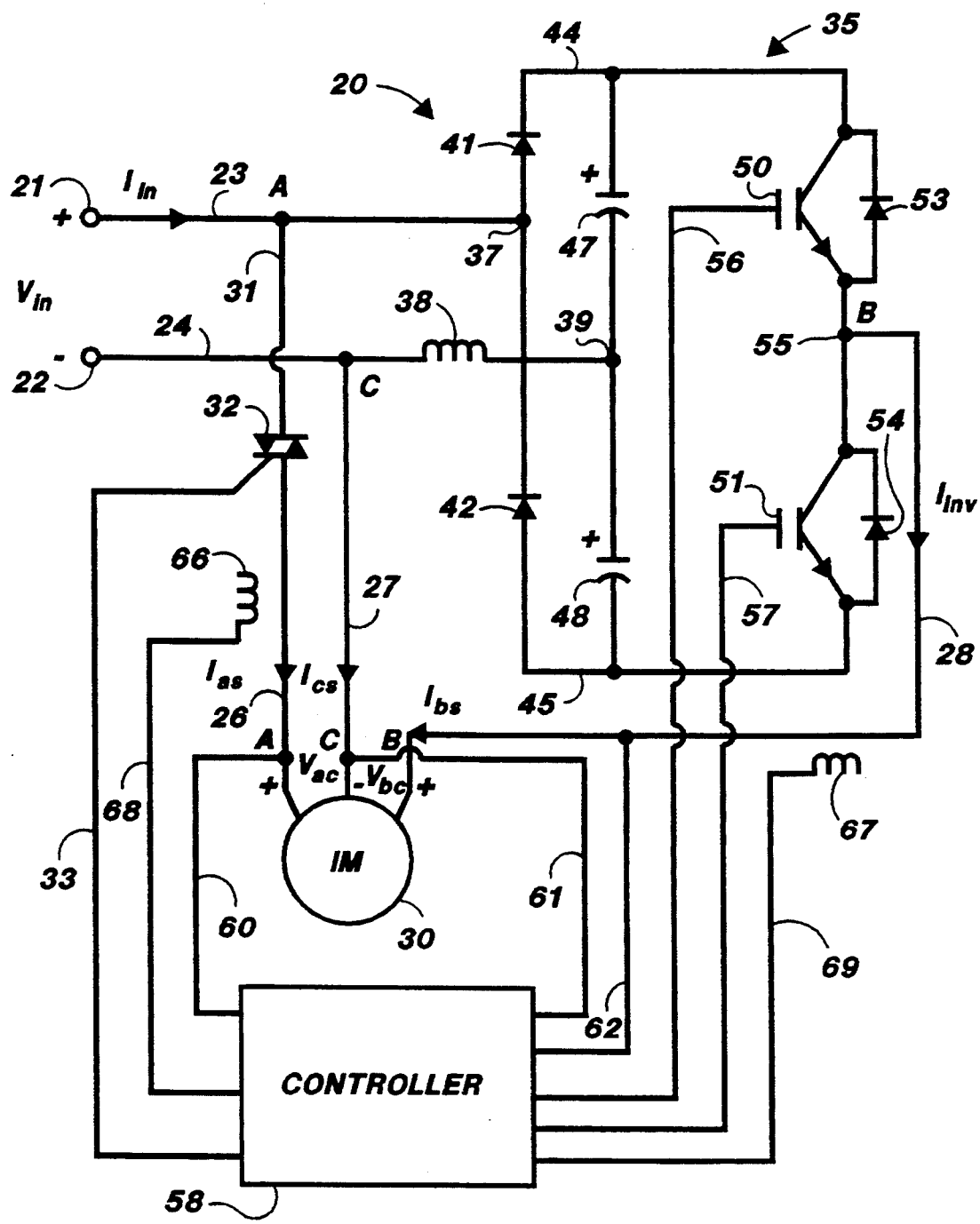
FIG. 1 is a schematic circuit diagram of a single phase to three phase converter for three phase motor drive in accordance with the present invention.

With reference to the drawings, a schematic circuit diagram of a single phase to three phase converter motor controller in accordance with the present invention is shown generally at 20 in FIG. 1. The converter receives single phase AC input power at first and second input terminals 21 and 22, which are connected to first and second input lines 23 and 24, respectively. Three phase power is provided on three output lines 26, 27, and 28, which are illustratively shown connected to a motor 30 which is driven by the three phase output power from the converter. One of the output lines 27 is connected to one of the single phase input lines—in FIG. 1, the line 24. Another output line 26 is connected to receive power from the other single phase input line 23 through a connecting line 31 and a bi-directional switch 32, e.g., a triac or parallel thyristors, which has a gate control line 33. The third output line 28 receives power from an inverter circuit 35.

The inverter circuit 35 is connected to receive the input power on the single phase input lines 23 and 24. The input line 23 is connected to a first node 37 of the inverter circuit, while the second input line 24 is connected through an inductor 38 to a second node 39 of the inverter circuit. Two diodes 41 and 42 are connected together at the node 37 and are connected in series between two DC bus lines 44 and 45 of the inverter. Two capacitors 47 and 48 are connected together at the node 39 and are also connected in series across the DC bus lines 44 and 45. Two gate controlled switching devices 50 and 51, each having integral anti-parallel diodes 53 and 54, respectively, are connected together at a node 55 and are connected in series across the DC bus lines 44 and 45. The node 55 is connected to the output line 28. The switching devices 50 and 51 are controlled by control signals on their gate lines 56 and 57, respectively, to invert the DC voltage on the DC bus lines 44 and 45 to a selected AC voltage or current.

In accordance with the present invention, the switching of the bi-directional switch 33 and the switching of the two inverter switches 50 and 51 (which may be, e.g., power transistors such as insulated gate bipolar transistors), is accomplished to provide appropriate three phase power to the motor 30 to start the motor, and then to run it either at a desired rated speed or at a variable speed where speed control is required. The bi-directional switch 32 allows high torque starting of the motor 30, as explained further below, without the need for starting capacitors. Starting is carried out by operating the bi-directional switch 32 and the inverter circuit 35 to provide currents on the output lines 26, 27 and 28 of variable frequency to drive the induction motor up to speed from a starting condition.

Control signals are provided to the switching devices 50 and 51 of the inverter, on the lines 56 and 57, and to the bi-directional switch 32, on the line 33, from a controller 58. The controller 58 monitors the current $I_{as}$ on the output line 26 by signals provided from a current transformer 66 on a line 68. The current $I_{bs}$ on the output line 28 is monitored by a current transformer 67 which provides a signal on a line 69 to the controller 58. The controller also receives the output voltages on the three output lines 26, 27, and 28 via lines 60, 61 and 62. The controller may comprise a microprocessor based system, e.g., utilizing any of various commercially available microprocessors or digital signal processors with associated memory including a PROM storing the program to provide the desired modes of operation as described below.

The converter 20 may be operated in four modes, some or all of which may be employed during a particular duty cycle of the motor 30. The first mode is a start-up mode, providing three phase power to the induction motor 30 at a low frequency to start it with sufficient torque to accelerate from a stop with a load connected to the motor. A second mode is entered after start-up to drive the motor up to or near rated operating speed. In this second mode, the three phase motor is supplied with single phase power. In a third mode, which may or may not be utilized during a normal duty cycle, the motor is provided with variable voltage power at rated frequency to allow variable speed operation of the motor. A fourth mode provides balanced three phase power to the motor at rated frequency.

Figure 2:
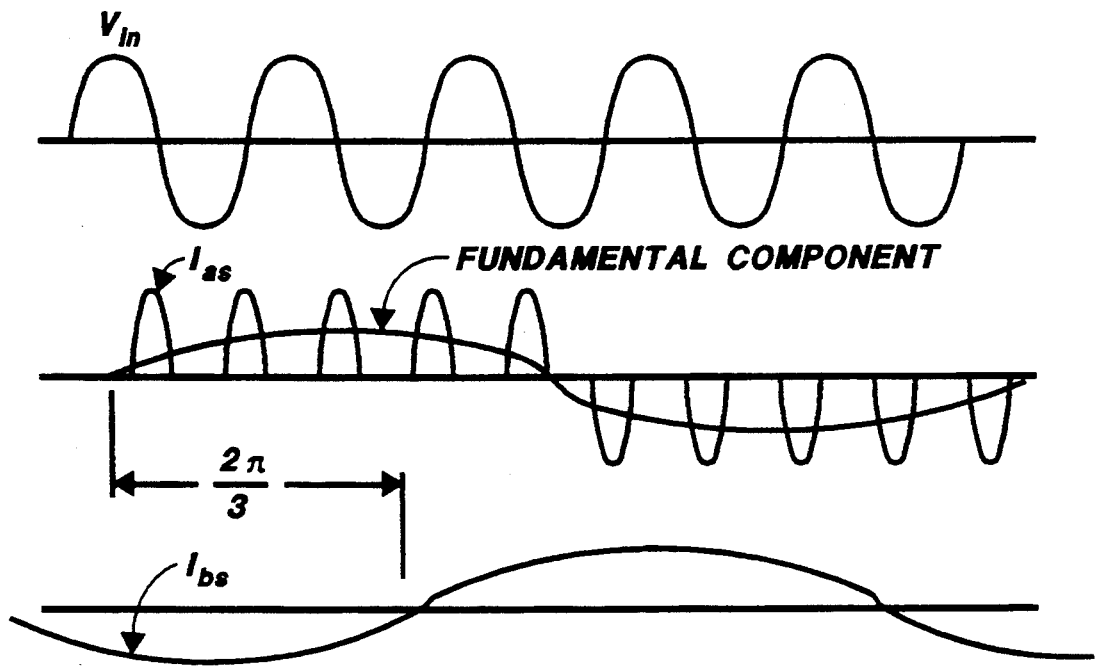
FIG. 2 are current and voltage waveforms for a variable frequency start-up mode of operation of the converter of the invention.

Exemplary waveforms for the first mode, slow speed (start-up) operation, are illustrated in FIG. 2, wherein the input voltage $V_{in}$ across the input terminals 21 and 22 is illustrated as well as the currents $I_{as}$ and $I_{bs}$ flowing in the output lines 26 and 28, respectively. The voltage $V_{in}$ is typically at 60 Hz. During start-up, it is desired to have current at a frequency lower than 60 Hz flowing into the motor to accomplish start-up. As illustrated in FIG. 2, the bi-directional switch 32 may be operated to turn on to provide pulses of current $I_{as}$ in one direction only for several cycles of the voltage input waveform $V_m$, and then be controlled to allow pulses of current to flow in the opposite direction for several cycles. The result is a current waveform which has a fundamental component at a lower frequency than the input voltage frequency and which is at a selected phase angle. Similarly, the inverter 35 is operated by switching the switching devices 50 and 51 to provide a fundamental component of the inverter current $I_{bs}$ which is at the same frequency as the fundamental component passed through the bi-directional switch 32, but which is displaced therefrom in phase by a desired phase angle, preferably 2]/3. The current in the third line 27, $I_{cs}$, will also be at the same fundamental frequency to balance the currents $I_{as}$ plus $I_{bs}$.

In the second mode, the switch 32 is turned off and the inverter circuit 35 provides single phase power at a variable frequency (which increases as the motor speeds up) to bring the motor up to or near rated speed.

Figure 3:
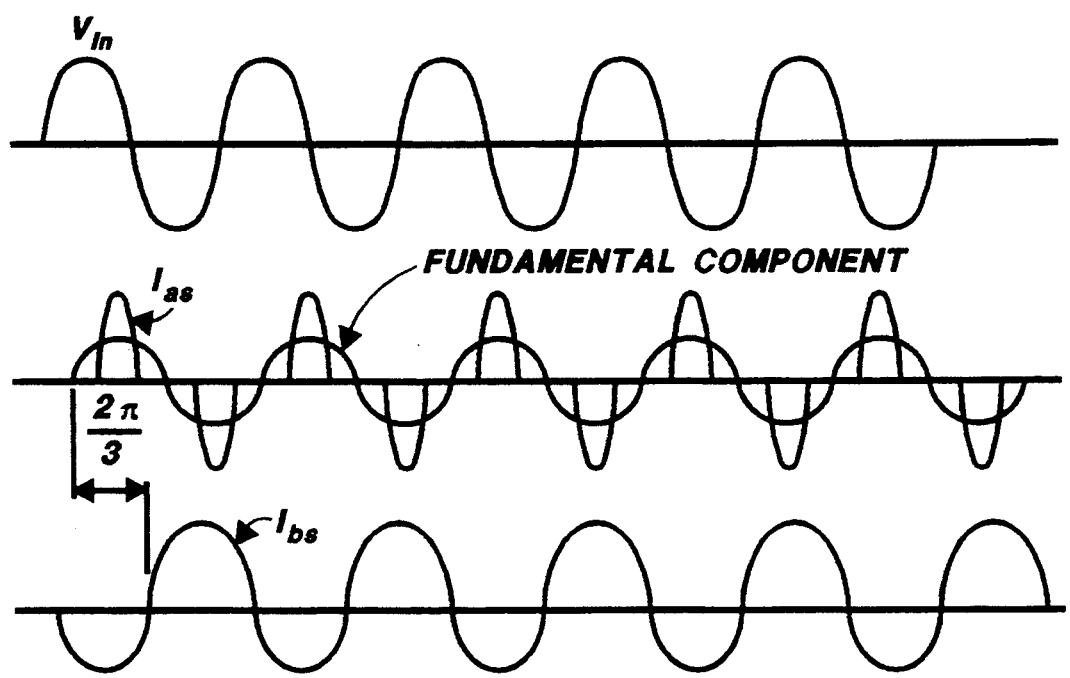
FIG. 3 are current and voltage waveforms for a variable voltage line frequency mode of operation of the converter of the invention.

FIG. 3 illustrates the input voltage and output current waveforms in the third mode where the motor is up to or near rated speed and is being supplied at line frequency. The bi-directional switch 33 is turned on and off to allow current to flow through the switch in both directions so that the fundamental component of the current $I_{as}$ is at the same frequency as the input voltage. However, the phase angle of turn-on is controlled to provide control over the phase voltage. The inverter circuit 35 is operated to provide an output current $I_{bs}$ which is also at the same frequency as the input voltage but phase shifted, e.g., by $2\pi/3$, from the current $I_{as}$ in the output line 26, as illustrated in FIG. 3.

Figure 9:
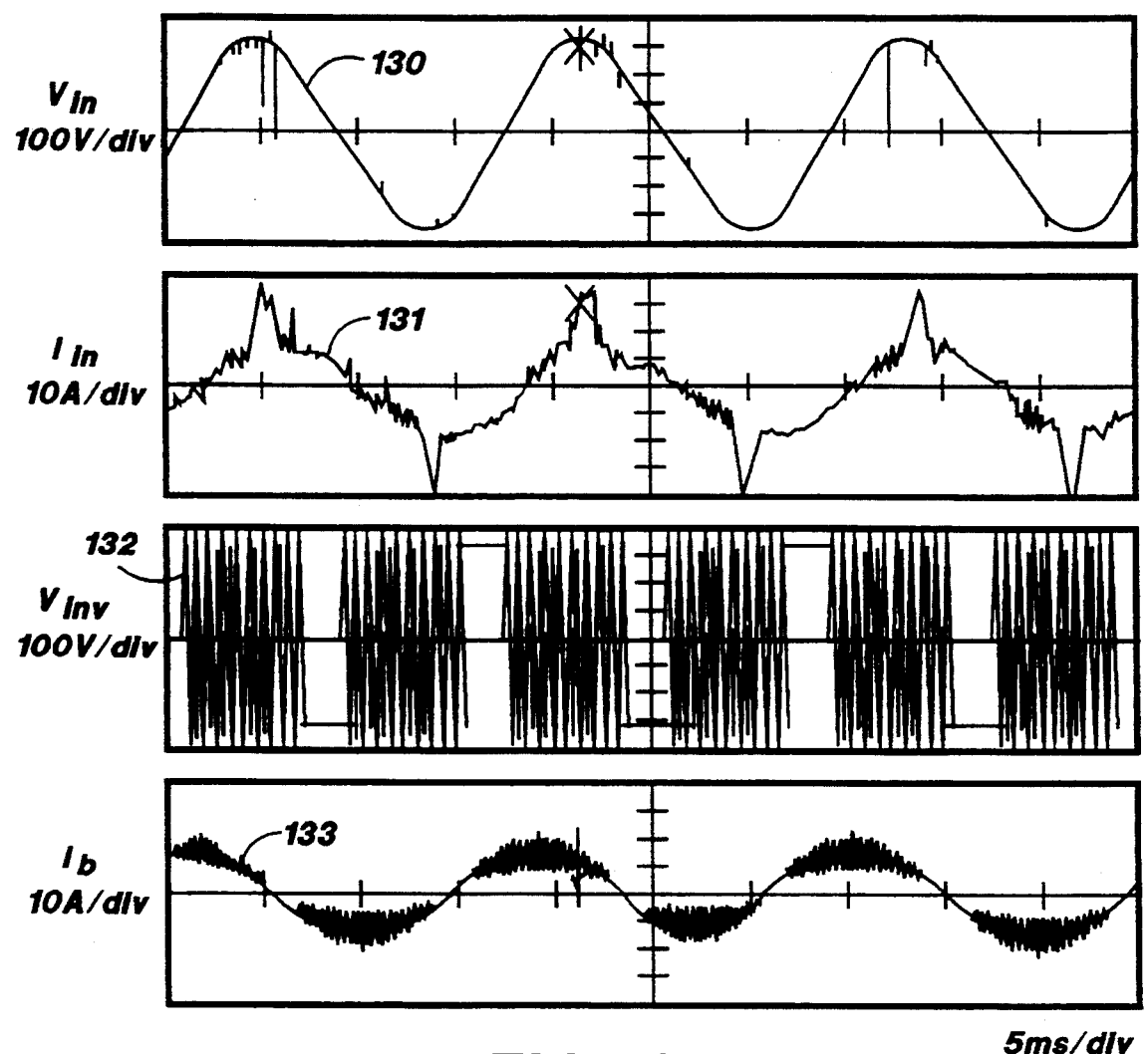
FIG. 9 are voltage and current waveforms in the steady state at full rated speed operation for the converter of the invention driving an exemplary three phase induction motor.

In the fourth mode, balanced three phase power is supplied to the motor, as illustrated by the exemplary waveforms of FIG. 9, described further below.

Figure 4:
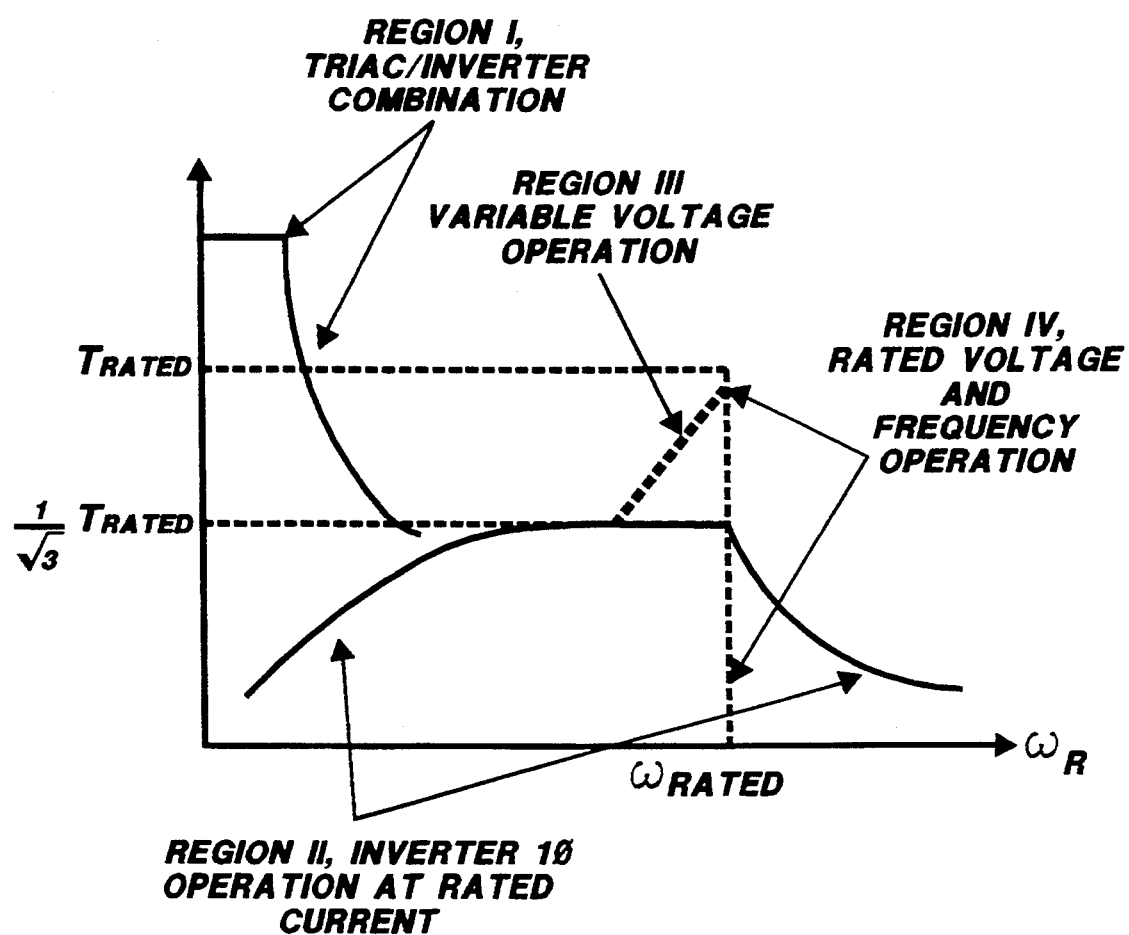
FIG. 4 is a diagram showing the possible speed-torque regions for power supplied by the converter to an exemplary motor for the various modes of operation of the converter.

FIG. 4 illustrates available speed-torque regions for driving of a three phase induction motor utilizing the converter of the present invention in each of its four modes. In the first mode, which is illustrated by a Region I in FIG. 4, the bi-directional switch 32 and the inverter circuit 35 are both controlled to provide start-up of the motor, providing a high starting torque above the rated torque of the motor. The bi-directional switch 32 is controlled in this mode to operate as a single phase cycloconverter. In the second mode, after start-up of the motor has occurred, which is illustrated by the Region II in FIG. 4, the bi-directional switch 32 is turned off and the inverter 35 is operated to provide single phase variable frequency power to the motor to drive the motor up in speed. In this mode of operation, the maximum torque that can be developed is approximately $1/\sqrt{3}$ of the rated torque, which is reached at and near the rated speed $\omega_{RATED}$. However, as illustrated in FIG. 4, in this second mode it is possible to drive the motor beyond its rated speed by operating the inverter above the rated frequency, with, however, a corresponding decline in available torque.

In the third mode of operation, illustrated by Region III in FIG. 4, variable voltage operation of the motor occurs with power supplied to all three phases near the rated speed and rated torque output of the motor. In this mode, the inverter 35 is operated to provide a desired output voltage level, and the bi-directional switch 32 is controlled to switch at desired phase angles, to provide desired output currents as illustrated in FIG. 3. This mode of operation allows variable speed control of the motor near its rated speed and its rated torque. Efficiency optimization for reduced load operation is also possible.

In the fourth mode, illustrated by Region IV in FIG. 4, the motor is operated at or near its rated speed and rated torque by turning on the bi-directional switch 32 to conduct constantly in both directions and controlling the inverter circuit 35 to provide balanced three phase power to the motor with very high input power factor.

As will be noted from FIG. 4, if operation at full speed of the motor is normally desired, the converter of the present invention allows the motor to get to rated conditions with very high starting torque, while nonetheless drawing limited in-rush current from the single phase AC power line during starting since the current drawn is controlled by the switch 32. A typical starting sequence would begin in Region I to provide high starting torque, switch over to Region II at intermediate speeds, and then either continue on to rated speed in Region II or switch to Region III to drive the motor up to rated speed, at which the control strategy is switched over to the fourth mode, Region IV, to drive the motor at rated speed and rated torque.

Figure 5:
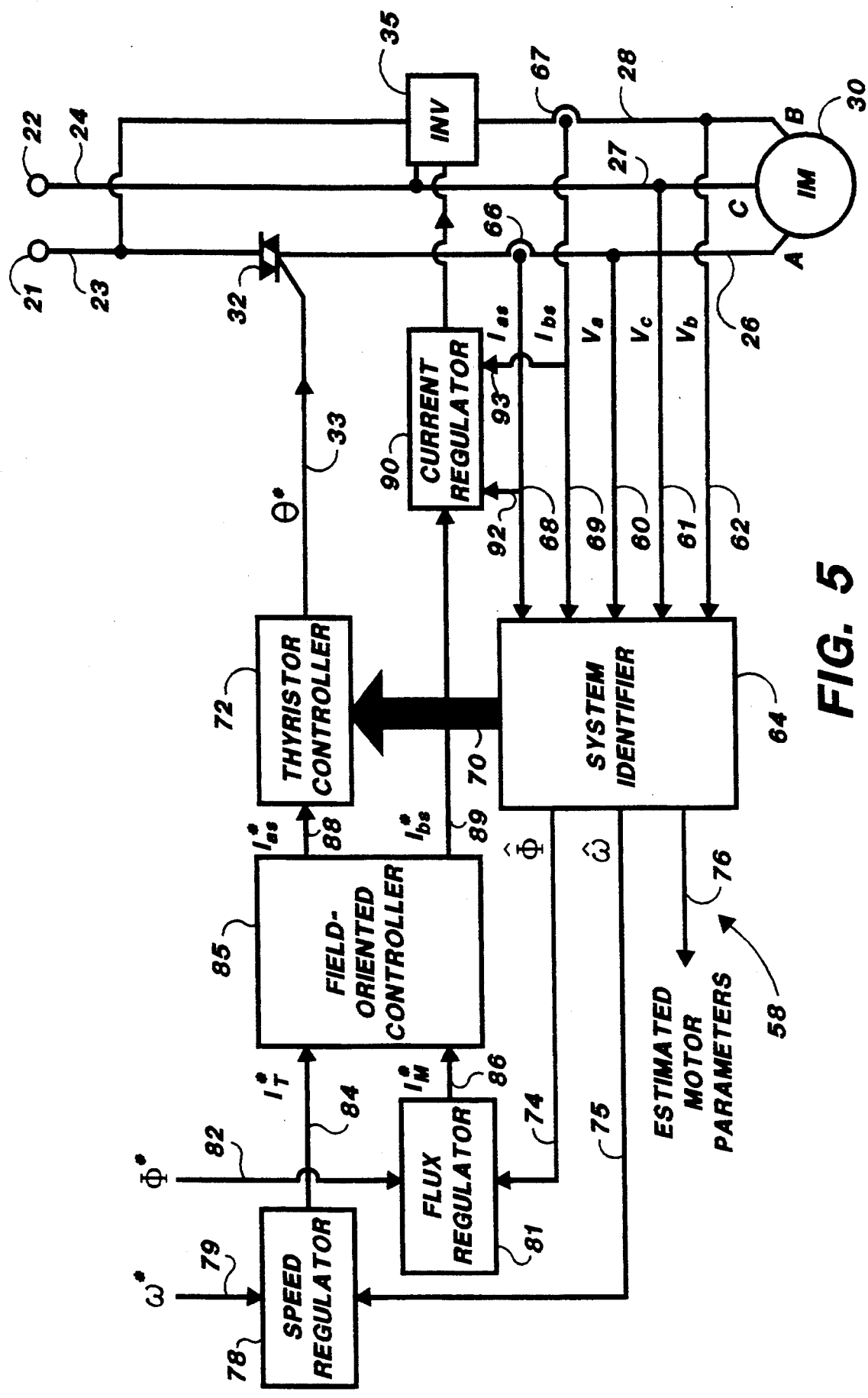
FIG. 5 is an illustrative block diagram showing the control structure of the controller for the converter of the invention during start-up.

A block diagram of the functional structure of the controller 58 in the first mode is shown in FIG. 5. In the preferred control structure, the current commands are calculated from a field-oriented controller, wherein the torque command is imposed by a speed regulator, and the flux command may be the rated value or may be regulated by a peak-torque/maximum efficiency controller. The current commands feed current regulators for each phase with a limited degree of freedom. In the control structure of FIG. 5, the voltages on the lines 26, 27 and 28, $V_a$, $V_c$ and $V_b$, respectively, are provided on the lines 60, 61 and 62 to a system identifier 64. The system identifier 64 also receives signals from the current transformers 66 and 67 on the lines 68 and 69, respectively, which represent the currents $I_{as}$ and $I_{bs}$. The system identifier provides output signals on control lines 70 to a controller 72 for the bi-directional switch 32 which provides the switching signals on the line 33 to the switch 32. The system identifier 64 also provides an estimated flux output signal on a line 74 and an estimated speed signal on a line 75, and makes available signals representing the estimated motor parameters on output lines 76. The estimated speed signal on the line 75 is received by a speed regulator 78 which also receives a rated or desired speed signal on a line 79. The estimated flux signal on the line 74 is received by flux regulator 81 which also receives an input on a line 82 representing the desired flux. The output signal from the speed regulator 78 on a line 84 is received by a field oriented controller 85 which also receives an output signal on a line 86 from the flux regulator 81. The field oriented controller 85 puts out a signal representing the desired phase current $I^*_{as}$ on a line 88 to the controller 72, and a signal representing the desired phase current $I^*_{bs}$ on a line 89 to a current regulator 90. The current regulator 90 also receives the measured currents $I_{as}$ and $I_{bs}$ on lines 92 and 93, respectively. The current regulator 90 puts out output signals on the control lines 56 and 57 to the inverter circuit 35 to control the switching of the switching devices 50 and 51 in the inverter.

Operation of the converter in the first mode, Region I, requires that the bi-directional switch 32 be operated as a cycloconverter. The current is a non-linear function of four variables: the triggering angle, the motor back EMF, the rotating speed of the flux, and the relative angle between the back EMF and the input voltage. A preferred control strategy in accordance with the present invention is to determine the switch firing angle by a look-up table and linear interpolation. The correct firing angle is calculated off-line and stored in a ROM memory in the controller 58 and retrieved to provide the desired value when performing on-line control. Storage of all possible calculated results would require a very large memory space, especially when the number of variables is large. Thus, it is preferable to calculate relatively fewer evenly spaced points along the possible working space of each variable and then store these results. Because the functions are relatively linear between the stored points, a few points along each axis are sufficient to reasonably model the features. To compute the desired firing angle on-line, the actual operating conditions are measured and the data stored in the memory adjacent to the working point are retrieved. Simple linear interpolation techniques are then used to calculate the final value.

Figure 7:
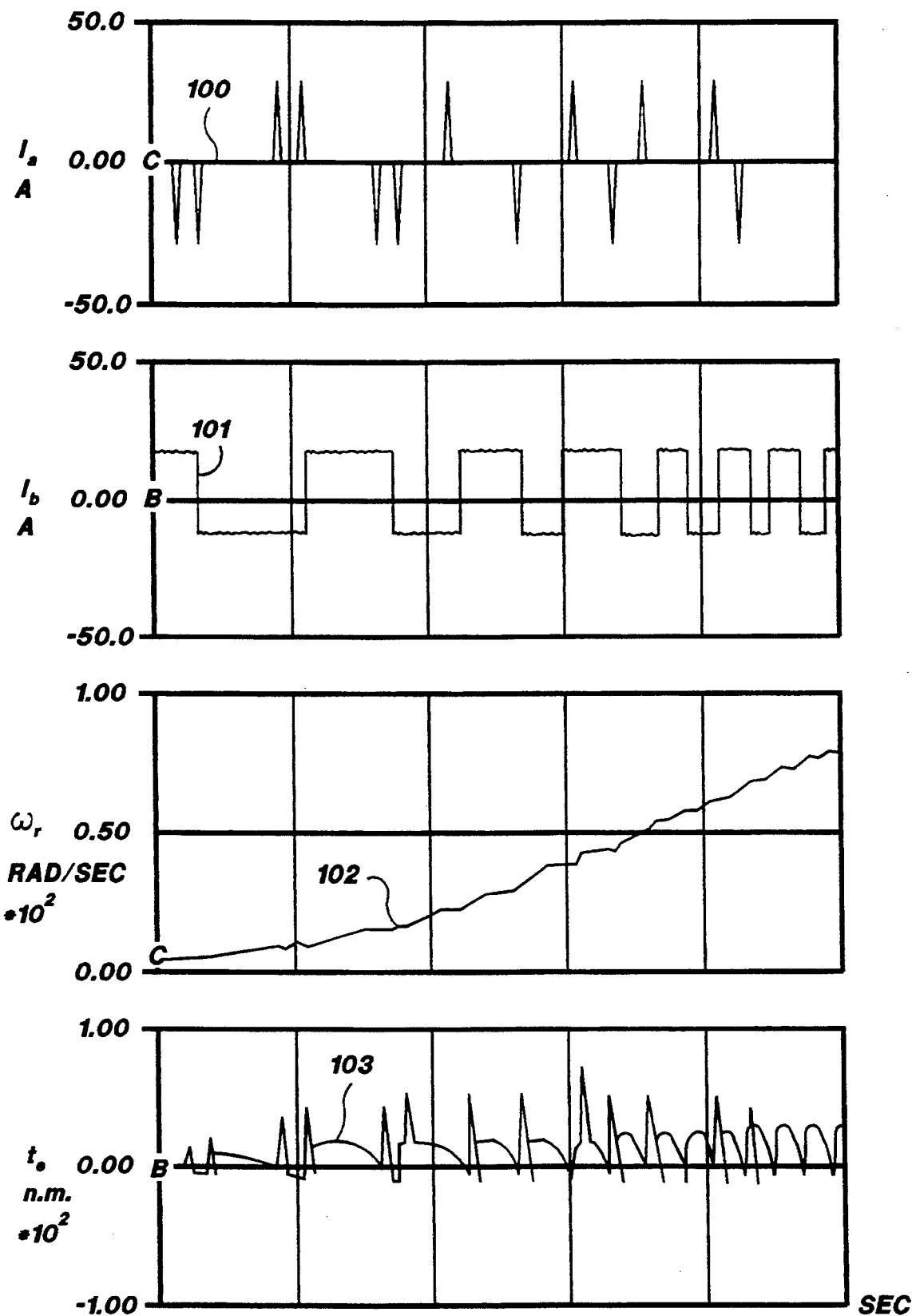
FIG. 7 are simulated current, speed and torque waveforms for the converter of the invention during start-up of an exemplary motor, simplified by eliminating capacitor voltage ripple.

FIG. 7 illustrates waveforms determined by simulation for a three switch converter as in FIG. 1, with the simplifying assumption of no capacitor voltage ripple. The waveforms illustrate the start-up of the motor using the preferred control strategy herein. The waveform 100 is the current $I_a$ as passed through the bi-directional switch 32, the waveform 101 is the current $I_b$ from the inverter 35, the waveform 102 is the motor speed $\omega_r$ in radians per second during start-up, and the waveform 103 is the motor torque $t_e$ as a function of time during start-up.

Figure 10:
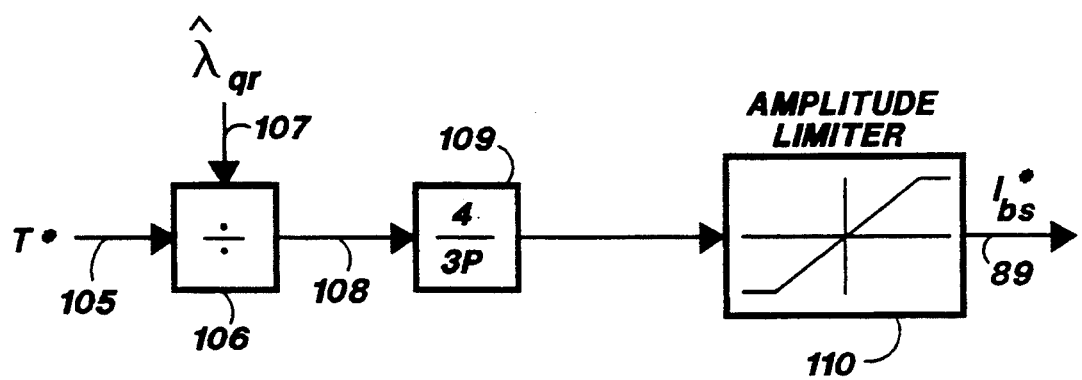
FIG. 10 is a block diagram of a controller structure for the converter during single phase operation of the converter.
Figure 11:
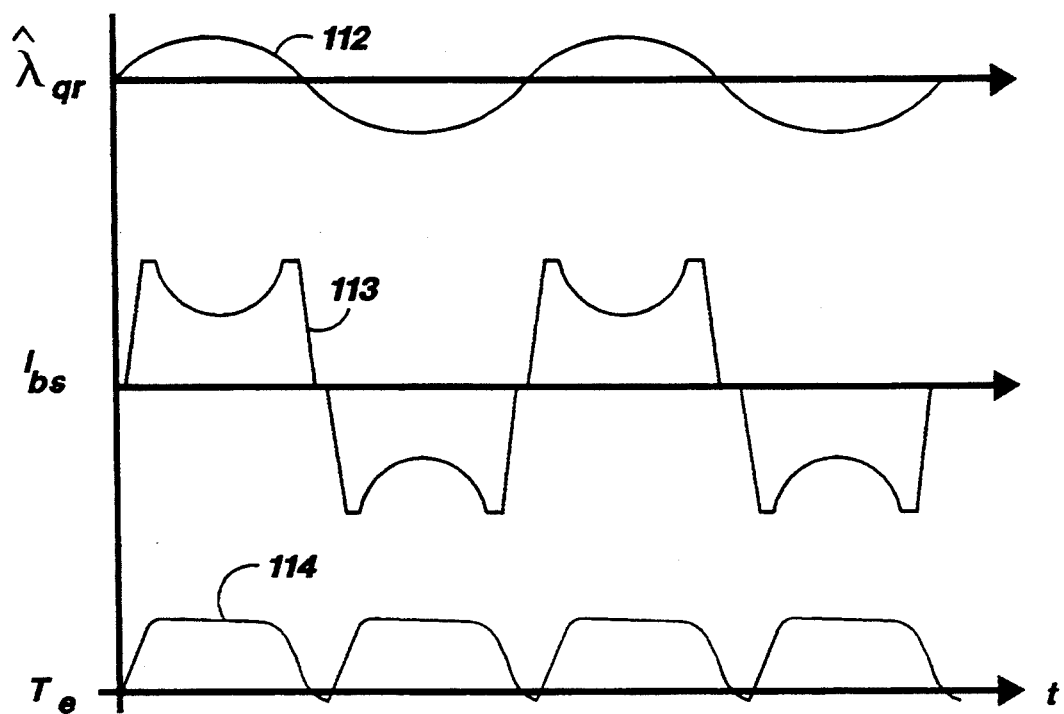
FIG. 11 are exemplary flux, phase current, and torque waveforms for single phase operation utilizing the controller of FIG. 10.

The frequency range over which the bi-directional switch 32 can be operated as a cycloconverter is limited. After the motor has been driven up in speed beyond the practical limit of operation of the bi-directional switch as a cycloconverter, the switch may be disabled and the motor run single phase in the second mode. An exemplary functional structure for the controller 58 for operation of the inverter with the bi-directional switch off is illustrated in FIG. 10. This control structure allows the motor to be controlled with relatively minimal torque ripple. As illustrated in FIG. 10, a desired torque command $T^*$ on a line 105 is received by a divider 106 which also receives a signal on a line 107 representing the Q axis stator flux linkage, which is orthogonal to the current vector when the inverter is operated in single phase. The output of the divider 106 on a line 108 is scaled at 109 and provided to an amplitude limiter 110 which provides an output signal on the line 89 to the current regulator 90 (as shown in FIG. 5) which represents the desired inverter current $I_{bs}^*$. Exemplary waveforms using this controller are shown in FIG. 11, wherein the stator flux linkage is represented by the waveform 112, the inverter current $I_{bs}$ by the waveform 113, and the motor torque $T_e$ by the waveform 114. Because of single phase operation of the motor, the torque is inevitably diminished at some point during each period. In addition, when the torque command is large, the current command tends to become a square wave, pushing the current to the maximum limit and inducing increased torque ripple.

In the fourth mode, Region IV of FIG. 3, the AC input voltage across the terminals 21 and 22 forms one of the line to line phase voltages supplied to the motor 30. The inverter switching devices 53 and 54 are controlled to generate a third phase voltage with either a leading or lagging phase shift of $\pi/3$ with respect to the incoming voltage. The leading phase voltage is preferable since the input power factor is improved and the output current distortion is found to be lower.

Figure 15:
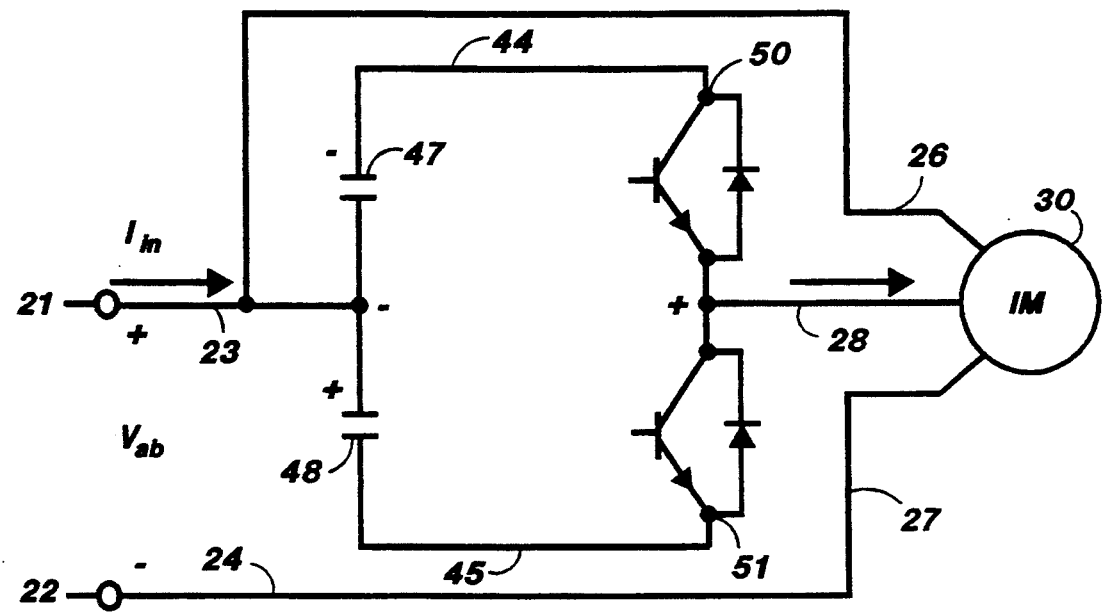
FIG. 15 is a simplified equivalent circuit diagram for the converter in the fourth mode at full rated speed.

The operation of the inverter in the fourth mode can be understood by noting that the diodes 41 and 42 conduct for a very short duration during each fundamental cycle. Consequently, the fundamental frequency behavior can be modeled by ignoring the diodes. This results in a simplified equivalent circuit as shown in FIG. 15. Under steady state conditions, the inverter 35 must provide a balanced three phase fundamental voltage to the motor. The inverter can generate an output voltage which essentially equals the input voltage magnitude, depending on voltage drops in the various devices and the DC bus ripple. In general, the inverter may need to be over-modulated, but balanced operation is nonetheless possible with acceptable distortion in the motor output waveform. FIG. 9 illustrates results for an exemplary three horsepower three phase induction motor driven in the steady state by the circuit of FIG. 1 for a leading mode of operation. The graph 130 is the input voltage $V_{in}$, the graph 131 is the input current $I_{in}$, the graph 132 is the inverter output voltage and the graph 133 is the inverter phase current $I_b$. As apparent in FIG. 9, the output current $I_b$ is controlled to be essentially a sinusoid, and can be obtained utilizing the controller structure described below.

Figure 16:
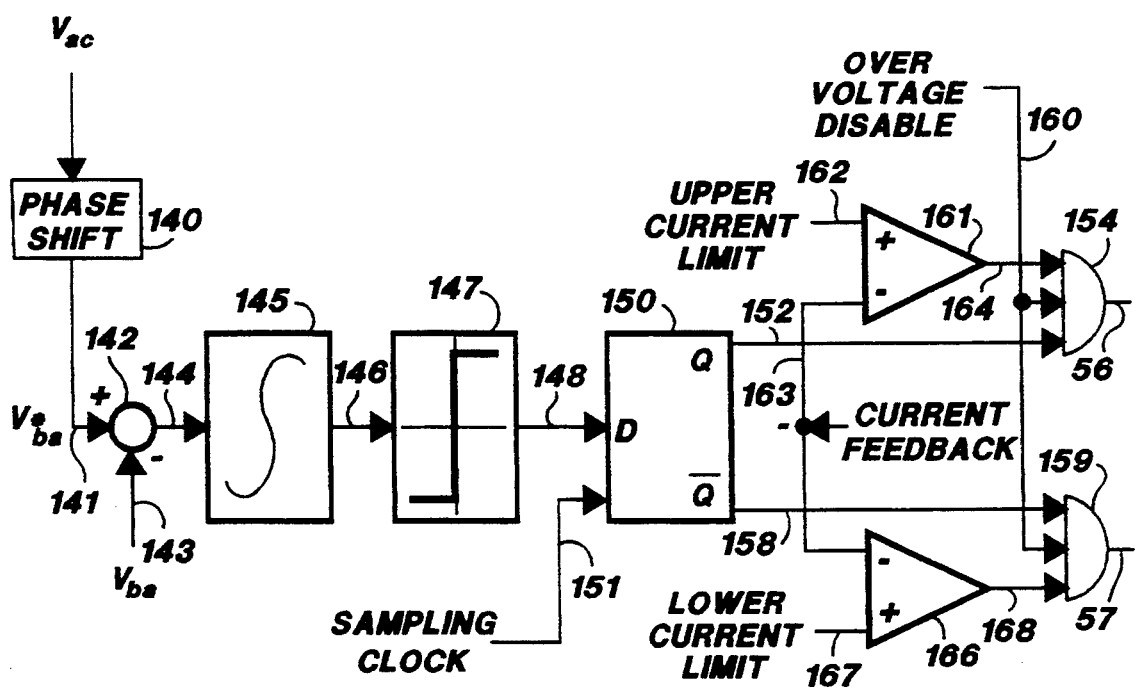
FIG. 16 is a block diagram of the controller structure for controlling the inverter of the converter in the fourth mode.

A block diagram of an exemplary functional structure for the controller 58 during steady state operation in the fourth mode at rated speed is shown in FIG. 16. In this exemplary structure, a reference voltage $V_{ca}^*$, generated for example by a phase shifter 140 receiving the voltage $V_{ac}$ across the input lines which adds a leading phase of $\pi/3$, is provided on an input line 141 to a summing junction 142, and the actual phase voltage $V_{ba}$ is provided on a line 143 to the summing junction 142. The output of the summing junction 142 on a line 144 is provided to an integrator 145 to provide a smoothed output signal on a line 146 to a limiter 147. The output of the limiter on a line 148 is provided to the input of a flip-flop 150 which receives at its clock input a sampling clock signal on a line 151. The non-inverting output of the flip-flop 150 is provided on a line 152 to an AND gate 154, the output of which on line 56 is provided to the gate of the first gate controlled switching device 50. The inverted output of the flip-flop 150 is provided on line 158 to an AND gate 159, the output of which on the line 57 is provided to the gate of the second gate controlled switching device 51. The AND gates 154 and 159 also receive as inputs an over-voltage disable signal from a line 160 (e.g., as provided from a comparator comparing output voltage to a reference). A comparator 161 receives an upper current limit voltage (e.g., from a potentiometer) on a line 162 to its positive input and an output maximum current feedback signal on a line 163 to its negative input. The output of the comparator 161 is also provided as an input on a line 164 to the AND gate 154. A comparator 166 receives a lower current limit voltage (e.g., from a potentiometer) on a line 167 and the current feedback signal on the line 163, and provides its output on a line 168 to another input of the AND gate 159. The current feedback signal on the line 163 provides the output current from the inverter (e.g., as monitored by a current transformer). The overvoltage disable signal thus will drive the outputs of the AND gates 154 and 159 to an off state whenever an overvoltage occurs. When an upper current limit is reached, the AND gate 154 will be turned off, and when a lower current limit is reached, the AND gate 159 will be turned off. It is seen from the circuit of FIG. 16 that the signals provided to the gates of the inverter switches 50 and 51 will cause these switches to switch in a modulated manner so that the output voltage follows the reference voltage $V_{ba}^*$ and will correct for any disturbances in the output voltage as a result of the feedback signal of the actual phase voltage $V_{ba}$, and will produce a substantially sinusoidal output voltage.

Figure 17:
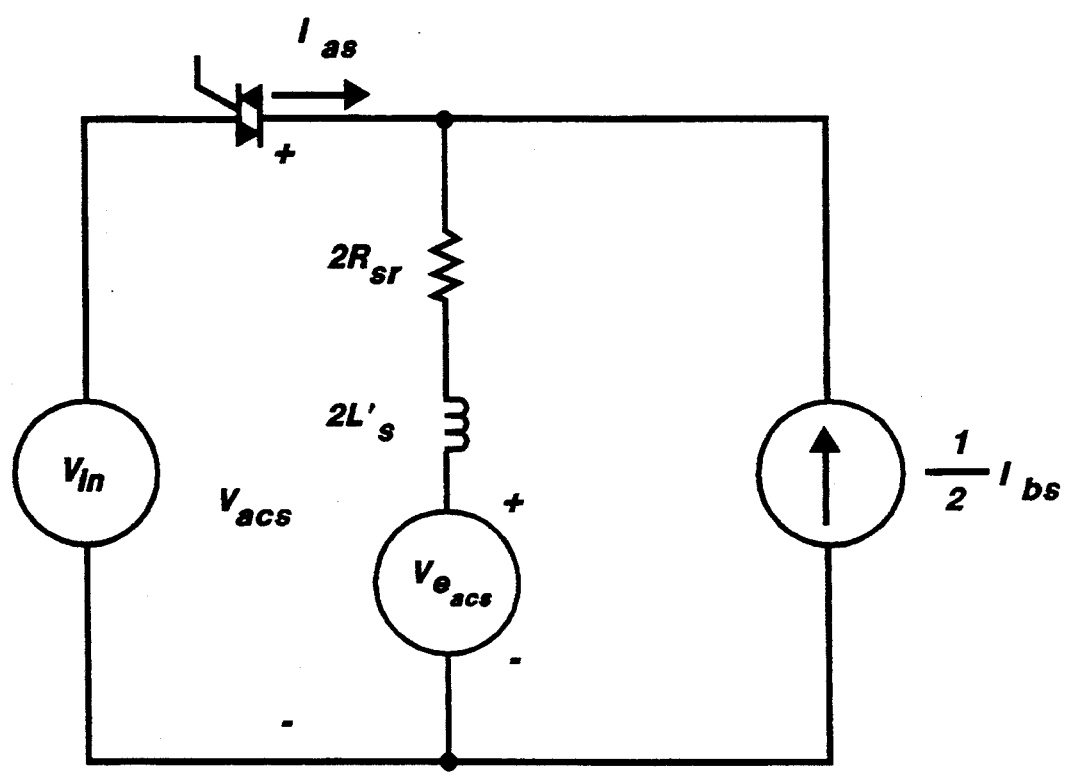
FIG. 17 is an equivalent circuit diagram for determining the control of the bi-directional switch in the variable frequency first mode of the converter.

The control of the current through the bi-directional switch 32 (e.g., a triac) in the first mode is complex, but a good system model can reduce the computation load significantly. In the converter 20 the triac 32 may be characterized as a voltage switch with limited controllability, while the two-switch inverter 35 is a very good current regulator. To control a motor in the first mode, control of output current is more effective than control of the voltage; therefore, there is no reason to operate the inverter in the voltage control mode. For this reason, an asymmetrical circuit model with a voltage input in one side and a current source at the other side can be used, as shown in FIG. 17.

Assuming that the rotor flux linkage amplitude and the motor speed do not change significantly in a short period, then the back emf is a rotating vector with roughly constant amplitude and rotating speed; therefore, $Ve_{acs}$ is essentially a sinusoidal voltage described as follows $$Ve_{acs} = V_{em}\sin(\omega_f t + \theta_f) \tag{1}$$

where $$V_{em} = \sqrt{3}\ \frac{L_m}{L_r}\ |\lambda_{qdr}|\sqrt{\frac{1}{\tau_r^2} - \omega_r^2} =$$

the peak of the back *emf* voltage $\omega_f$ = flux rotating speed
and $\theta_f$ = the angle difference between $V_{in}$ and $Ve_{acs}$
Assuming that the input voltage is also sinusoidal, $$V_{in} = V_m \sin(\omega_e t) \tag{2}$$

where $V_m$ is the peak of the input voltage.

The solution for $I_{as}$ (per unit or p.u.) for the equivalent circuit of FIG. 1 is:

$$(I_{as})_{p.u.}(t) = \int_{t_0}^{t} [p(I_{as})_{p.u.}]dt = \tag{3}$$

$$f[t,t_0,(V_{em})_{p.u.},\omega_f,\theta_f] - 0.5[(I_{bs})_{p.u.}(t) - (I_{bs}^{p.u.}(t_0)]$$

where $$f[t,t_0,(V_{em})_{p.u.},\omega_f,\theta_f] = \tag{4}$$

$$\frac{[\cos(\omega_e t_0) - \cos(\omega_e t)] - \frac{\omega_e}{\omega_f}(V_{em})_{p.u.}[\cos(\omega_f t_0 + \theta_f) - \cos(\omega_f t + \theta_f)]}{2(L_s)_{p.u.}}$$

and $t_0$ is the instant when the triac is triggered. The current reaches the peak roughly when the input voltage equals the motor emf if the resistance $R_{sr}$ is neglected. The peak value, $I_{peak}$, can be expressed as follows:

$$(I_{peak})_{p.u.} = \frac{f_p[t_0,(V_{em})_{p.u.},\omega_f,\theta_f]}{2(L_s)_{p.u.}} - -0.5[(I_{bs})_{p.u.}(t_1) - (I_{bs})_{p.u.}(t_0)] \tag{5}$$

where $f_p$ is a nonlinear function without an analytic expression and $t_1$ is the time when the triac stops conducting.

Due to the non-linearity, solving equation (5) in real time is not practical. Instead, it may be calculated off-line and the solution stored in the ROM memory of a microprocessor by which the control procedure is implemented in the controller 58. However, storing all possible outcomes of the equation requires excessive memory space. Therefore, as an alternative, only a small number of evenly spread points need be calculated and saved. Other points can be estimated from the nearest calculated points by using a linear interpolation strategy.

To further save memory the symmetry of the equation may be exploited. Because the equation has half-wave symmetry, only the responses for $(0 \geq \omega_e t_0 \geq \pi)$ need be calculated, and the results of the negative cycle are obtained by symmetry. Also, the range of $\theta_f$ which produces both negative torque and magnetizing current may be discarded to save memory space.

As an example, if five equal-distanced points for each variable are chosen, the solutions for equation (5) above may be calculated and stored in a four-dimensional matrix 'M', which has $5^4 = 625$ elements:

$$M(m1,m2,m3,m4) = f_p[t_0,(V_{em})_{p.u.},\omega_f,\theta_f] \tag{6}$$

where m1, m2, m3, and m4 are integer matrix indices and
(m1 $\in$ [0,1,2,3,4]), corresponding to ($\omega_e t_0 \in$ [0 ... $\pi$])
(m2 $\in$ [0,1,2,3.4]), corresponding to (($V_{em})_{p.u.} \in$ [0 ... 1]p.u.)
(m3 $\in$ [0,1,2,3,4]), corresponding to ($\omega_f \in$ [0 ... $\omega_e$])
(m4 $\in$ [0,1,2,3,4]), corresponding to ($\theta_f \in$ [0 ... $\pi$])

To control the firing of the triac, the input voltage amplitude is measured and the timing $\omega_e t$ is traced by a phase-locked loop. The motor back emf $V_{em}$ can be approximately measured from the motor terminal voltage before the triac is triggered, or can be calculated, where the parameters and the states are either measured or estimated. The angle $\theta_f$ is calculated from the orientation of the flux vector with respect to the input voltage, while the flux rotating velocity can be calculated by the strategies described below. These four parameters are normalized and become real numbers $r_n$, where n=1,2,3, or 4, and $r_n$ is the range of [0 ... 4). Then, the fractions are truncated to get the following integers, n1, n2, n3, and n4:

$$n_n = int(r_n) \epsilon [0,1,2,3], n=1,2,3, \text{ or } 4 \quad (7)$$

From these integers, the corresponding element in the matrix M is retrieved
$f_{p0} = M(n1, n2, n3, n4)$
as are the data around the above point
$f_{p1} = M(n1+1, n2, n3, n4)$
$f_{p3} = M(n1, n2, n3+1, n4)$
$f_{p4} = M(n1, n2, n3, n4+1)$
The final result is calculated by the following linear interpolation equation:

$$f_p = f_{p0} + \sum_{n=1}^{4} (r_n - n_n)(f_{pn} - f_{p0}) \quad (8)$$

This is a p.u. value and the actual value must be recovered by dividing it by two times the estimated per unit motor leakage inductance and then multiplying it by the base current. The variation of current $I_{bs}$ during the triac conduction period may be accounted for to improve the results. The leakage inductance may also be obtained from other estimation procedures and adapted when an error is sensed.

Two methods can be used to estimate the rotation speed of the rotor flux linkage. First, it can be calculated from the sum of the rotor angular speed and the slip frequency:

$$\omega_f = \omega_r + \omega_{sl} \quad (9)$$

where $$\omega_{sl} = R_r \frac{I_{qs}}{\lambda_r} \quad (10)$$

Or, the incremental angular variation can be calculated. Assuming the flux linkage vector can be measured in every fixed time interval $\Delta T$, the measured or estimated vectors are $$\lambda_{qdr}(k) = \lambda_{qr}(k) - j\lambda_{dr}(k) \quad (11)$$

$$\lambda_{qdr}(k+1) = \lambda_{qr}(k+1) - j\lambda_{dr}(k+1) \quad (12)$$

Then, their vector cross product is $$\lambda_{qdr}(k+1) \times \lambda_{qdr}(k) = |\lambda_{qdr}(k)||\lambda_{qdr}(k+1)|\sin(\Delta\theta) = \quad (13)$$
$$\lambda_{qr}(k)\lambda_{dr}(k+1) - \lambda_{dr}(k)\lambda_{qr}(k+1)$$

where $\Delta\theta$ is the angular movement during the period $\Delta T$. If $\Delta\theta$ is small, $\sin(\Delta\theta) \approx \Delta\theta$, and the flux rotating speed can be calculated as $$\omega_f = \frac{\Delta\theta}{\Delta T} = \frac{1}{\Delta T} \frac{\lambda_{qr}(k)\lambda_{dr}(k+1) - \lambda_{dr}(k)\lambda_{qr}(k+1)}{|\lambda_{qdr}(k)||\lambda_{qdr}(k+1)|} \quad (14)$$

If the flux linkage amplitude does not change too much in a small time interval, the equation can be approximated by $$\omega_f = \frac{\Delta\theta}{\Delta T} \approx \frac{1}{\Delta T} \frac{\lambda_{qr}(k)\lambda_{dr}(k+1) - \lambda_{dr}(k)\lambda_{qr}(k+1)}{\lambda_{qr}(k)^2 + \lambda_{dr}(k)^2} \quad (15)$$

or $$\omega_f = \frac{\Delta\theta}{\Delta T} \approx \frac{1}{\Delta T} \frac{\lambda_{qr}(k)\lambda_{dr}(k+1) - \lambda_{dr}(k)\lambda_{qr}(k+1)}{\lambda_{qr}(k+1)^2 + \lambda_{dr}(k+1)^2} \quad (16)$$

or the average value of the above equations may be used, if possible.

To construct a field oriented controller for an induction motor, information concerning the rotor flux linkage is required. It is possible, of course, to use sensors to determine the flux linkage, although such sensors generally require modification of the motor. Alternatively, a state observer may be used to estimate the rotor flux linkage. The simplest flux observer structures include the open loop voltage model observer and the open loop current model observer.

$$\lambda_{qds} = \int (V_{qds} - R_s I_{qds}) dt \quad (17)$$

and $$\lambda_{qdr} = \frac{L_r}{L_m} [\lambda_{qds} - L_s' I_{qds}] \quad (18)$$

where symbols with " ^ " represent estimated quantities. This model gives good results at high motor speed and is relatively insensitive to motor parameters except for the stator resistance. The accuracy deteriorates at very low motor speed if the stator resistance used in the model is not correct.

Another low-cost choice is the open-loop current-model flux observer. The equation is expressed as follows:

$$\lambda_{qdr} = \int \left[ R_r \frac{L_m}{L_r} I_{qds} - \left( \frac{1}{\tau_r} - j\omega_r \right) \lambda_{qdr} \right] dt \quad (19)$$

To simplify this expression, it is rewritten as $$\lambda_{qdr} = \int [K_1 I_{qds} - (K_2 - jK_3)\lambda_{qdr}] dt \quad (20)$$

where $$K_1 = R_r \frac{L_m}{L_r} \quad (21)$$

$$K_2 = \frac{1}{\tau_r} \quad (22)$$

$$K_3 = \omega_r \quad (23)$$

The current model is sensitive to rotor time constant and rotor resistance, and is affected by the slip frequency.

If it is assumed that the motor does not operate in the very low speed region so that the estimated flux linkage signals from the open-loop voltage-model observer are reliable, the calculated results for the voltage model may be compared with the outputs of a current-model observer to generate the following error vector $$e = (\lambda_{qdr}^* - \lambda_{qdr}) \quad (24)$$

Also, the absolute amplitude of the error square is $$|e^2| = e \cdot e^* \quad (25)$$

where '·' means the vector inner product and '8' represents the complex conjugate. Partially differentiating the error squared with respect to the estimated parameters $K_1, K_2$, and $K_3$ yields:

$$\frac{\partial(|e^2|)}{\partial K_1} = e \cdot I_{qds} \quad (26)$$

$$\frac{\partial(|e^2|)}{\partial K_2} = -e \cdot \lambda_{qdr} \quad (27)$$

$$\frac{\partial(|e^2|)}{\partial K_3} = e \cdot (j\lambda_{qdr}) \quad (28)$$

Figure 6:
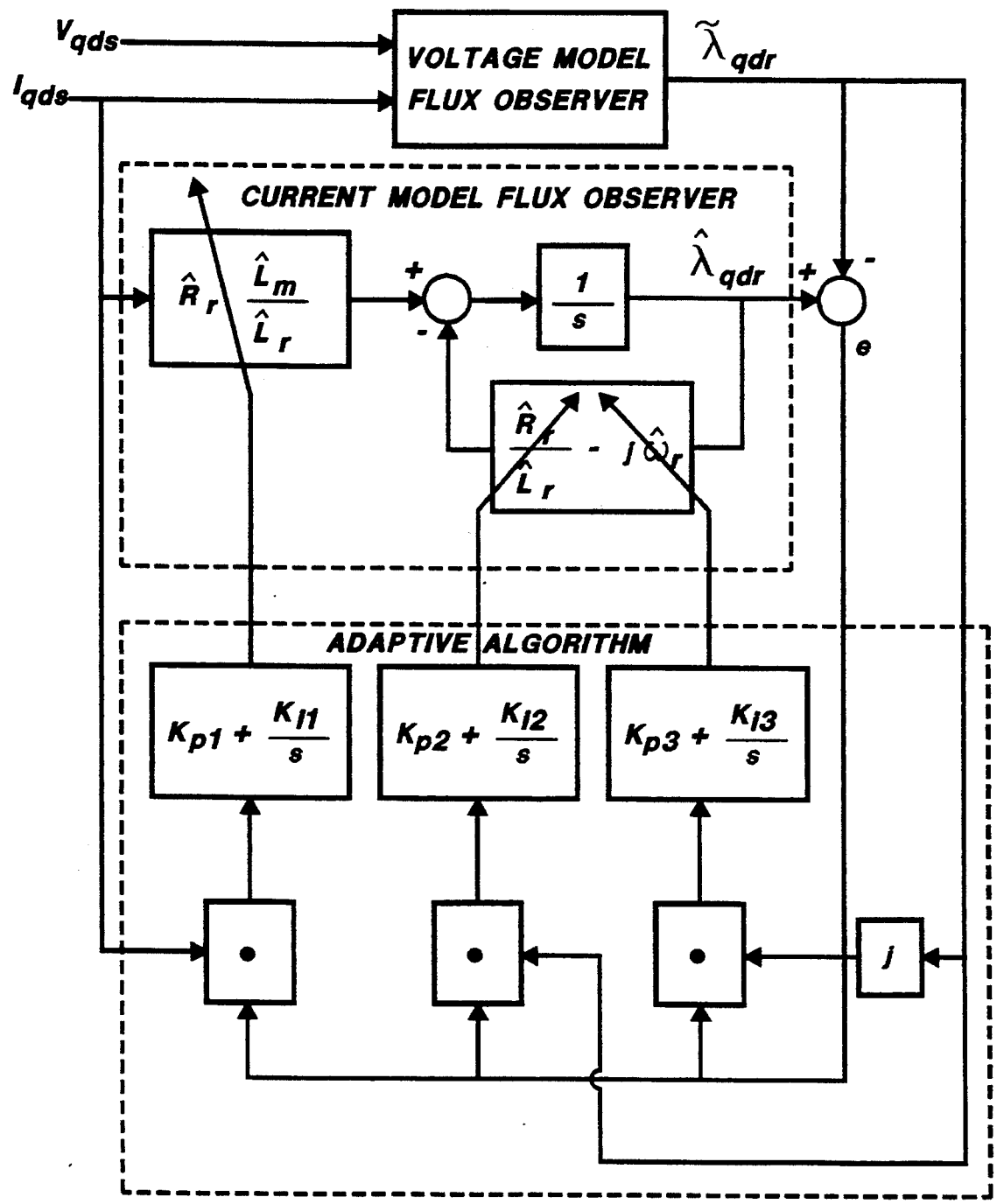
FIG. 6 is a block diagram of the system identification function of the controller of FIG. 5.

Finally, a parameter adaptive strategy is implemented as follows:

$$K_1 = K_{10} - K_{i1} \int \left[\frac{\partial(|e^2|)}{\partial K_1}\right] dt - K_{p1} \left[\frac{\partial(|e^2|)}{\partial K_1}\right] \quad (29)$$

$$K_2 = K_{20} - K_{i2} \int \left[\frac{\partial(|e^2|)}{\partial K_2}\right] dt - K_{p2} \left[\frac{\partial(|e^2|)}{\partial K_2}\right] \quad (30)$$

$$K_3 = K_{30} - K_{i3} \int \left[\frac{\partial(|e^2|)}{\partial K_3}\right] dt - K_{p3} \left[\frac{\partial(|e^2|)}{\partial K_3}\right] \quad (31)$$

where the parameters with '0' subscripts represent initial guessed values, and $K_{ij}$ versus $K_{pj}$, $j=1,2$, or 3, are control parameters. This system identification strategy is shown in block diagram form in FIG. 6.

This adaptive algorithm works well only when the signals contain a wide-spread frequency spectrum. Not all signals are detectable in steady-state with sinusoidal excitation.

The adaptive strategy works better if the initial values are correctly chosen. This can be done by making some initial measurement before the motor starts, but it takes time. A possible method is to imbed a strategy in the controller and to measure the motor characteristics on-line. The preferred strategy is to inject a certain pattern of current to identify the motor parameters, and also to build up the initial rotor flux linkage to expedite the motor start-up procedure.

Figure 12:
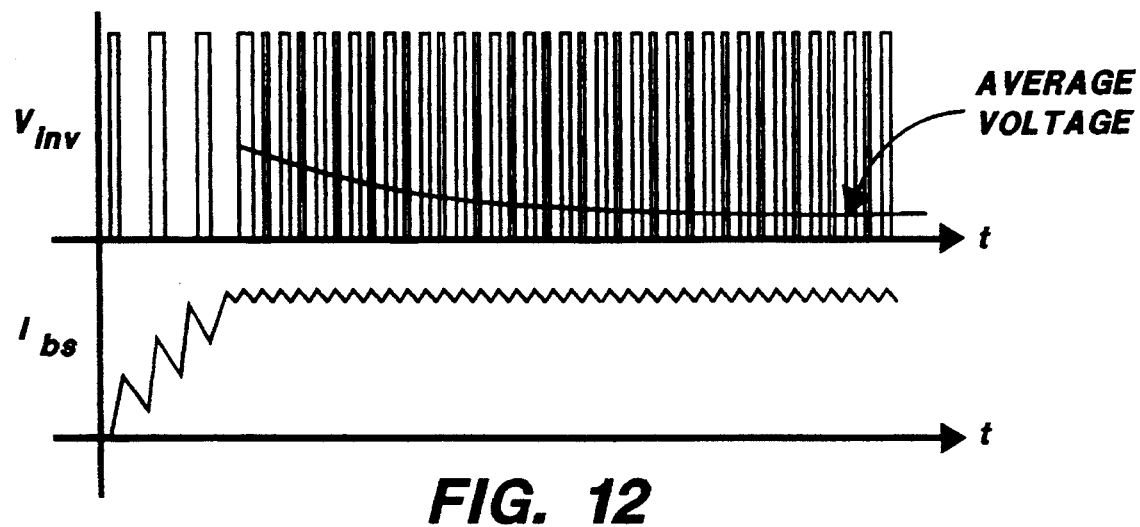
FIG. 12 are illustrative voltage and current waveforms which may be obtained during a parameter testing procedure for the controller.
Figure 13:
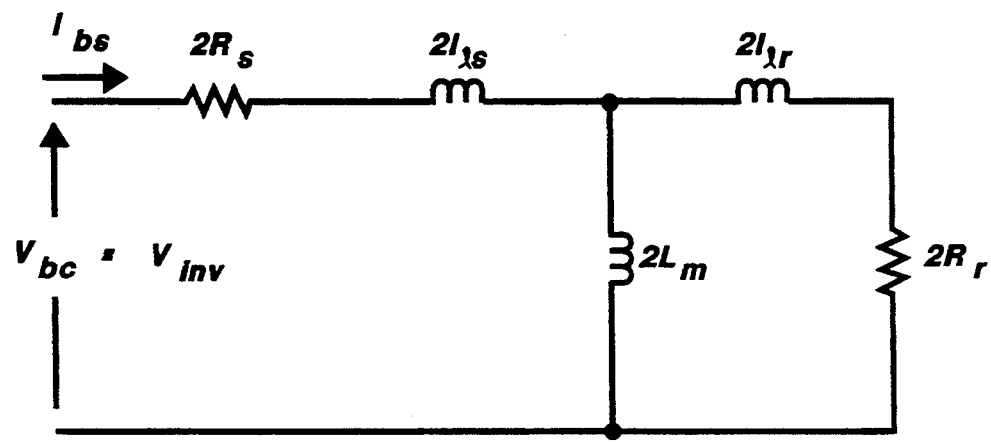
FIG. 13 is an equivalent circuit for the converter-motor circuit with the bi-directional switch off and the motor not running.

The switching pattern activates the inverter 35 to build up the motor current $I_{bs}$ to a certain level. The pattern should be rich in harmonics, as shown in FIG. 12, so that the characteristics can be easily measured from the response. To simplify the analysis, the switch 32 is assumed disabled. If the motor is not running, the equivalent circuit is illustrated in FIG. 13. Neglecting the magnetizing branch, the short-term transient response can be characterized by $$pI_{bs} \cong \frac{V_{bc} - 2(R_s + R_r)I_{bs}}{2(L_{1s} + L_{1r})} \quad (32)$$

or $$pI_{bs} \cong K_4 V_{bc} - K_5 I_{bs} \quad (33)$$

where $$K_4 = \frac{1}{2(L_{1s} + L_{1r})} \quad (34)$$

$$K_5 = \frac{(R_s + R_r)}{(L_{1s} + L_{1r})} \quad (35)$$

An adaptive equation as follows can be constructed to approach the real system:

$$pI_{bs} \cong K_4 V_{bc} - K_5 I_{bs} \quad (36)$$

and define $$e_I = (I_{bs} - \hat{I}_{bs}) \quad (37)$$

therefore $$\frac{\partial(|e_I^2|)}{\partial K_4} = e_I \cdot V_{bc} \quad (38)$$

$$\frac{\partial(|e_I^2|)}{\partial K_5} = -e_I \cdot V_{bs} \quad (39)$$

Finally, the parameters can be adapted by the following equations.

$$K_4 = K_{40} - K_{i4} \int \left[\frac{\partial(|e_I^2|)}{\partial K_4}\right] dt - K_{p4} \left[\frac{\partial(|e_I^2|)}{\partial K_4}\right] \quad (40)$$

$$K_5 = K_{50} - K_{i5} \int \left[\frac{\partial(|e_I^2|)}{\partial K_5}\right] dt - K_{p5} \left[\frac{\partial(|e_I^2|)}{\partial K_5}\right] \quad (41)$$

Figure 14:
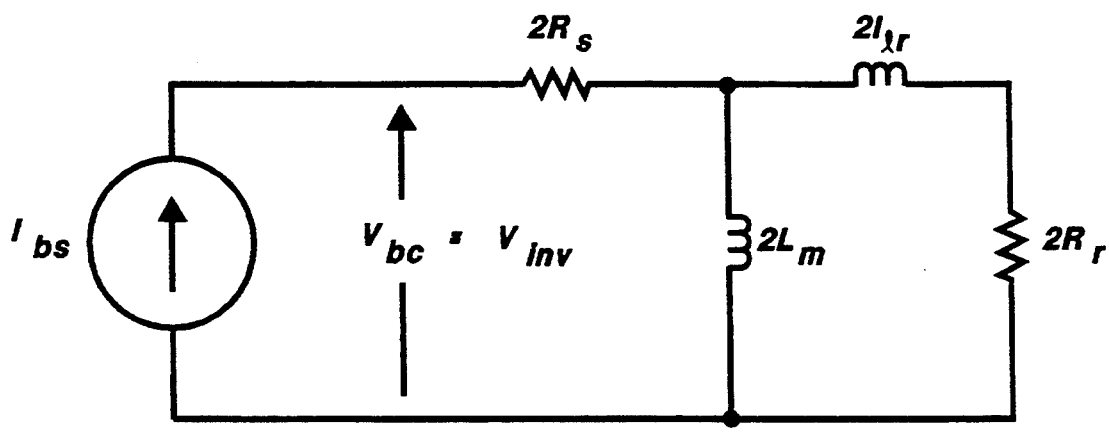
FIG. 14 is an equivalent circuit for the converter-motor circuit once the current reaches the preset value and is kept constant.

After the current reaches the preset value, it is kept constant, and the equivalent circuit is shown in FIG. 14. The terminal voltage response should follow the equation:

$$V_{bc}(t) \approx I_{bs}(R_s + R_r e^{-t/\tau_r}) \quad (42)$$

Again, the parameter $R_s$, $R_r$ and $\tau_r$ can be identified by similar equations. These estimated values are used as the initial values for Equations (29)–(31), which guarantee a good beginning of the adaptive algorithm.

Figure 8:
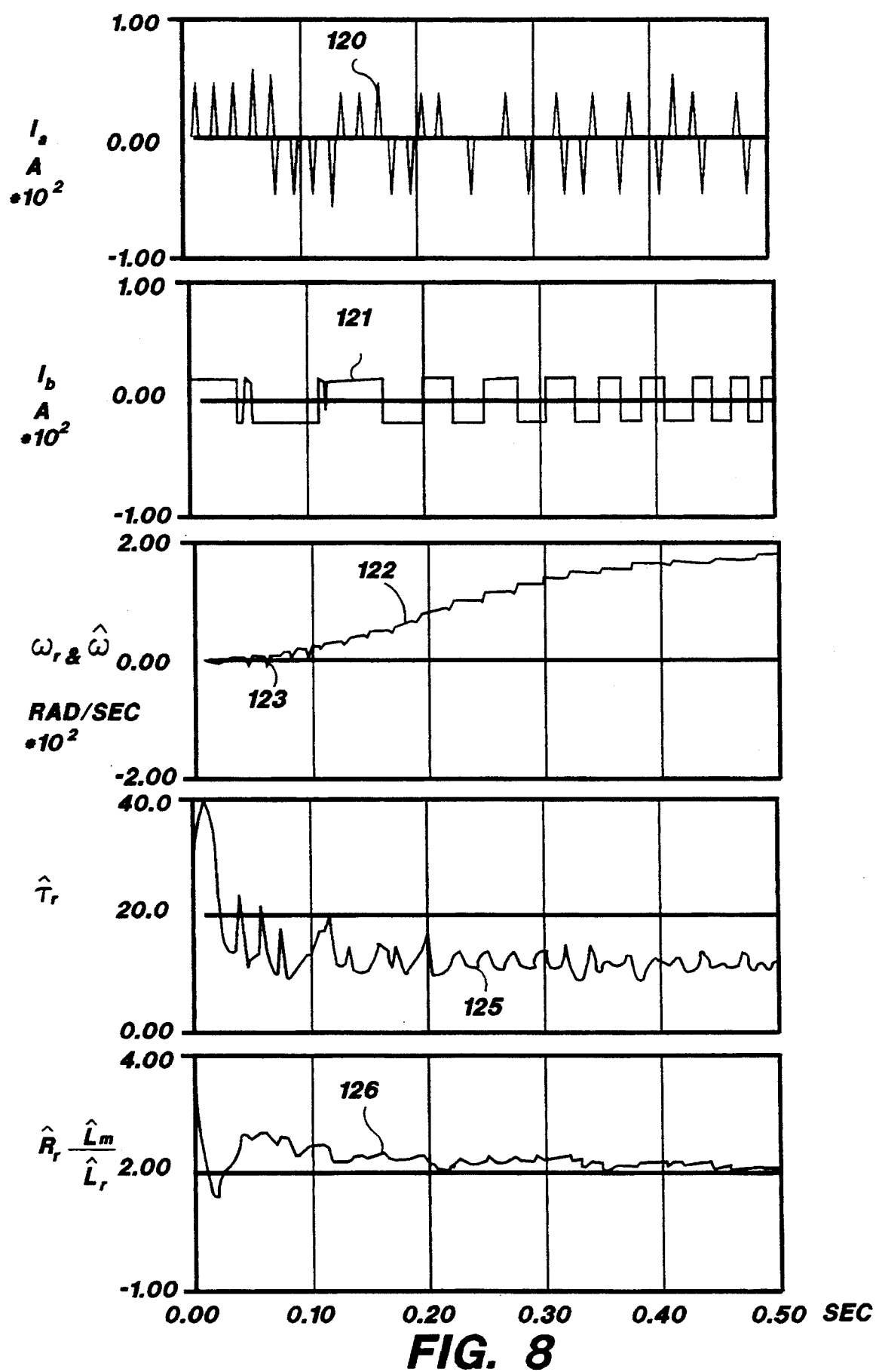
FIG. 8 are simulated waveforms showing the operation of the system identification strategy of the controller of the present invention.

Waveforms obtained from a simulation of the foregoing system identification strategy are illustrated in FIG. 8. The waveform 120 is the current $I_a$ through the bi-directional switch, the waveform 121 is the current $I_b$ from the inverter, the waveform 122 is the actual motor speed $\omega_r$, the waveform 123 is the identified value of motor speed $\omega_r$, the waveform 125 is the identified motor time constant $\tau_r$ (the actual value is 10), and the waveform 126 is the parameter $$\frac{R_r L_m}{L_r}$$

(the actual value is 1.92). It is seen from these waveforms that the rotor time constant, rotor resistance, and motor speed converge to the accurate values quickly.

It is thus seen that the converter of the present invention provides a low cost structure which nonetheless enables variable speed three phase induction motor drive from a single phase supply. Additional important features of the invention include high starting torque with low in-rush current, a wide speed range for a majority of loads, operation at full speed with low input distortion and high input power factor, acceptable tradeoffs between high torque and low torque ripple, real time controlling for the switching circuit, and system identification where sensorless control is desired.

It is understood that the invention is not confined to the particular embodiments set forth herein as illustrative, but embraces such modified forms thereof as come within the scope of the following claims.

What is claimed is:

1. Apparatus for converting a single phase AC input to a three phase AC output comprising:
   (a) a pair of single phase AC input terminals connected to a pair of input lines;
   (b) three output lines connectable to a three phase motor load;
   (c) an inverter circuit connected to the input lines to receive single phase AC power therefrom and having an output node connected to one of the output lines, the inverter circuit responsive to control signals to provide an AC output voltage at its output node;
   (d) a bi-directional switch responsive to a control signal connected between one of the input lines and a second of the output lines, the third output line connected to the other of the input lines;
   (e) control means, connected to monitor the voltage on the three output lines and the output current through the bi-directional switch and from the inverter circuit, for providing control signals to the bi-directional switch and the inverter circuit to provide output currents from the inverter circuit and through the bi-directional switch to the motor which have fundamental frequency components lower than the frequency of the AC input voltage on the input lines and at different phases whereby controlled start-up of a three phase AC motor connected to the output lines can be obtained.

2. The apparatus of claim 1 wherein the inverter circuit includes a pair of DC bus lines, a pair of capacitors connected together at a node and connected across the DC bus lines, the node between the capacitors connected to one of the input lines, a pair of rectifying diodes connected together at a node and connected across the DC bus lines, the node between the diodes connected to the other of the input lines, and two gate controlled switching devices connected together at the output node and connected across the DC bus lines, and wherein the control means controls the switching of the switching devices in the inverter circuit.

3. The apparatus of claim 2 wherein the gate controlled switching devices are power transistors.

4. The apparatus of claim 1 wherein the control means estimates the speed of a motor connected to the output lines from the measured output voltages and the inverter circuit and bi-directional switch currents and provides a controlled start-up of the motor by providing fundamental current components at increasing frequency on the output lines as the speed of the motor increases.

5. The apparatus of claim 1 wherein after a motor connected to the output lines has started up and approaches its rated speed, the control means controls the bi-directional switch to conduct constantly and controls the inverter to provide balanced three phase voltages across the three output lines.

6. The apparatus of claim 1 wherein the bi-directional switch is a triac.

7. The apparatus of claim 1 wherein the control means provides controlled start-up of a motor connected to the output lines by providing increasing frequency output current through the bi-directional switch and from the inverter circuit as the speed of the motor increases, and after start-up of the motor, the control means turns off the bi-directional switch and operates the inverter circuit to provide single phase power to the motor to drive the motor up to near rated speed, and then turns on the bi-directional switch to conduct constantly and controls the switching of the inverter circuit to provide balanced three phase output voltages on the three output lines.

8. The apparatus of claim 7 wherein after start-up of a motor connected to the output lines when the motor has reached at or near its rated speed, the control means operates the inverter circuit to provide a selected voltage level at the rated frequency to the motor and switches the bi-directional switch to provide a selected phase delay of conduction and a selected voltage level on the output line connected to the bi-directional switch at the rated frequency, such that the voltage applied to the motor at the three output lines at the rated frequency of the motor may be varied to control the motor speed and flux level.

9. Apparatus for converting a single phase AC input to a three phase AC output which is provided to a three phase induction motor comprising:
   (a) a pair of single phase AC input terminals connected to a pair of input lines;
   (b) three output lines connectable to the three phase motor load;
   (c) an inverter circuit connected to the input lines to receive single phase AC power therefrom and having an output node connected to one of the output lines, the inverter circuit including a pair of DC bus lines, a pair of capacitors connected together at a node and connected across the DC bus lines, the node between the capacitors connected to one of the input lines, a pair of rectifying diodes connected together at a node and connected across the DC bus lines, the node between the diodes connected to the other of the input lines, and two gate controlled switching devices connected together at the output node and connected across the DC bus lines;
   (d) a bi-directional switch responsive to a control signal connected between one of the input lines and a second of the output lines, the third output line connected to the other of the input lines;
   (e) control means, connected to monitor the voltage on the three output lines and the output current through the bi-directional switch and from the inverter circuit, for providing control signals to the bi-directional switch and the gate controlled switching devices of the inverter circuit to provide output currents from the inverter circuit and through the bi-directional switch to the motor which have fundamental frequency components lower than the frequency of the AC input voltage on the input lines and at different phases and at increasing frequency as the speed of the motor increases to provide controlled start-up of motor connected to the output lines, wherein after start-up of the motor, the control means turns off the bi-directional switch and controls the switching devices of the inverter circuit to provide single phase power of increasing frequency to the motor as the motor increases in speed until the speed of the motor is near its rated speed, and thereafter controls the bi-directional switch to conduct constantly and controls the switching devices of the inverter circuit to provide balanced three phase power to the motor at the rated frequency of the motor.

10. The apparatus of claim 9 wherein the control means estimates the motor speed from the measured output voltages and the inverter circuit and bi-directional switch currents and provides a controlled start-up of the motor by providing fundamental current components at increasing frequency as the speed of the motor increases.

11. The apparatus of claim 9 wherein the gate controlled switching devices are power transistors and the bi-directional switch is a triac.

12. The apparatus of claim 9 wherein after start-up of the motor when the motor has reached at or near its rated speed, the control means operates the switching devices of the inverter circuit to provide a selected voltage level at the rated frequency to the motor and to switch the bi-directional switch to provide a selected phase delay of conduction and a selected voltage level on the output line connected to the bi-directional switch at the rated frequency, such that the voltage applied to the motor at the three output lines at the rated frequency of the motor may be varied to control the motor speed and flux level.

13. Apparatus for converting a single phase AC input to a three phase AC output which is provided to a three phase induction motor, comprising:
  (a) a pair of single phase AC input terminals connected to a pair of input lines;
  (b) three output lines connectable to a three phase motor load;
  (c) an inverter circuit connected to the input lines to receive single phase AC power therefrom and having an output node connected to one of the output lines, the inverter circuit responsive to control signals to provide an AC output voltage at its output node;
  (d) a bi-directional switch responsive to a control signal connected between one of the input lines and a second of the output lines, the third output line connected to the other of the input lines;
  (e) control means, connected to monitor the voltage on the three output lines and the output current through the bi-directional switch and from the inverter circuit, for providing control signals to the bi-directional switch and the inverter circuit when the motor has reached at or near its rated speed to operate the inverter circuit to provide a selected voltage level at the rated frequency to the motor and to switch the bi-directional switch to provide a selected phase delay of conduction and a selected voltage level on the output line connected to the bi-directional switch at the rated frequency, such that the voltage applied to the motor at the three output lines at the rated frequency of the motor may be varied to control the motor speed and flux level.

14. The apparatus of claim 13 wherein the inverter circuit includes a pair of DC bus lines, a pair of capacitors connected together at a node and connected across the DC bus lines, the node between the capacitors connected to one of the input lines, a pair of rectifying diodes connected together at a node and connected across the DC bus lines, the node between the diodes connected to the other of the input lines, and two gate controlled switching devices connected together at the output node and connected across the DC bus lines, and wherein the control means controls the switching of the switching devices in the inverter circuit.

15. The apparatus of claim 14 wherein the gate controlled switching devices are power transistors and the bi-directional switch is a triac.

16. Apparatus for converting a single phase AC input to a three phase AC output comprising:
  (a) a pair of single phase AC input terminals connected to a pair of input lines;
  (b) three output lines connectable to a three phase motor load;
  (c) an inverter circuit connected to the input lines to receive single phase AC power therefrom and having an output node connected to one of the output lines, the inverter circuit including a pair of DC bus lines, a pair of capacitors connected together at a node and connected across the DC bus lines, the node between the capacitors connected to one of the input lines, a pair of rectifying diodes connected together at a node and connected across the DC bus lines, the node between the diodes connected to the other of the input lines, and two gate controlled switching devices connected together at the output node and connected across the DC bus lines;
  (d) a bi-directional switch responsive to a control signal connected between one of the input lines and a second of the output lines, the third output line connected to the other of the input lines;
  (e) control means, connected to monitor the voltage on the three output lines and the output current through the bi-directional switch and from the inverter circuit, for providing control signals to the bi-directional switch and the inverter circuit switching devices to provide output currents from the inverter circuit and through the bi-directional switch to the motor which have fundamental frequency components lower than the frequency of the AC input voltage on the input lines and at different phases whereby controlled start-up of a three phase AC motor connected to the output lines can be obtained.

17. The apparatus of claim 16 wherein the control means estimates the speed of a motor connected to the output lines from the measured output voltages and the inverter circuit and bi-directional switch currents and provides a controlled start-up of the motor by providing fundamental current components at increasing frequency on the output lines as the speed of the motor increases.

18. The apparatus of claim 16 wherein the gate controlled switching devices are power transistors and the bi-directional switch is a triac.

19. The apparatus of claim 16 wherein after a motor connected to the output lines has started up and approaches its rated speed, the control means controls the bi-directional switch to conduct constantly and controls the inverter circuit to provide balanced three phase voltages across the three output lines.

20. The apparatus of claim 17 wherein, after start-up of the motor, the control means turns off the bi-directional switch and operates the inverter circuit to provide single phase power to the motor to drive the motor up to near rated speed, and then turns on the bi-directional switch to conduct constantly and controls the switching of the inverter circuit to provide balanced three phase output voltages on the three output lines.

21. A method of converting a single phase AC input to a three phase AC output to drive a three phase AC induction motor and to start the motor, comprising the steps of:

(a) providing an inverter circuit connected to the AC input lines which has switching devices therein which can be controlled to provide a selected AC output from the inverter circuit, and providing a bi-directional switch connected to one of the single phase AC input lines, the output of the bi-directional switch, the other of the AC input lines, and the output of the inverter providing output voltages connected to the motor;

(b) on start-up of the motor, switching the bi-directional switch on and off in one direction of conduction only during a plurality of cycles of the single phase AC input voltage, and then switching the bi-directional switch to conduct only in the other direction for a plurality of cycles of the single phase AC input voltage, and repeating the switching of the bi-directional switch to provide a fundamental component of current through the bi-directional switch which is lower than the frequency of the single phase AC input voltage;

(c) switching the switching devices of the inverter circuit to provide an output current from the inverter circuit which has a fundamental current component which is at the same frequency as the fundamental component of current passed through the bi-directional switch but at a phase angle with respect thereto.

22. The method of claim 21 wherein the phase angle between the fundamental component of the current passed through the bi-directional switch and the fundamental component of the current from the inverter circuit is $2\pi/3$.

23. The method of claim 21 including the additional steps of:

(1) determining the speed of the motor;

(2) increasing the frequency of the fundamental current passed through the bi-directional switch and the current from the inverter circuit as the speed of the motor increases to drive the motor up in speed from a start to a selected speed.

24. The method of claim 23 wherein, after the motor has reached the selected speed, turning off the bi-directional switch so that no current is passed therethrough, and switching the switching devices of the inverter to provide single phase power through the inverter circuit to the motor at a frequency which increases as the speed of the motor increases.

25. The method of claim 24 wherein, after the motor has reached a speed near its rated speed, then:

(1) turning on the bi-directional switch so that it conducts constantly; and (2) switching the switching devices of the inverter to provide balanced three phase voltages to the motor at the rated frequency of the motor.

26. The method of claim 24 wherein, after the motor has reached a speed at or near its rated speed, then:

(1) switching the bi-directional switch at the rated frequency of the motor to provide power to the motor at a selected voltage and phase angle, (2) switching the switching devices of the inverter circuit at the rated frequency of the motor to provide power to the motor at a selected voltage and a selected phase angle with respect to the phase angle of the voltage provided through the bi-directional switch;

(3) then, changing the point of conduction of the bi-directional switch on each cycle of the single phase AC input power and the switching of the switching devices of the inverter to change the level of the voltage provided to the motor at its rated frequency to control the speed and flux level of the motor.

* * * * *

UNITED STATES PATENT AND TRADEMARK OFFICE
CERTIFICATE OF CORRECTION

PATENT NO. : 5,402,053
DATED : March 28, 1995
INVENTOR(S) : Divan, et al.

It is certified that error appears in the above-indentified patent and that said Letters Patent is hereby corrected as shown below:

In column 5, line 18 of the patent, "$V_m$," should be --$V_{in}$,--

In column 5, line 29 of the patent, "2]/3." should be --$2\pi/3$.--

In column 10, lines 5-8 of the patent, the equation should read $$\text{where } f[t, t_0, (V_{cm})_{p.u.}, \omega_f, \theta_f] \qquad (4)$$

$$= \frac{[\cos(\omega_c t_0) - \cos(\omega_c t)] - \frac{\omega_c}{\omega_f}(V_{cm})_{p.u.}[\cos(\omega_f t_0 + \theta_f) - \cos(\omega_f t + \theta_f)]}{2(L_s)_{p.u.}}$$

In column 12, line 67 of the patent, "'8'" should be --'*'--

In column 14, line 15 of the patent, the equation should read as follows $$\frac{\partial(|e_I^2|)}{\partial \hat{K}_s} = -e_I \cdot I_{bs} \qquad (39)$$

UNITED STATES PATENT AND TRADEMARK OFFICE
CERTIFICATE OF CORRECTION

PATENT NO. : 5,402,053
DATED : March 28, 1995
INVENTOR(S) : Divan, et al.

It is certified that error appears in the above-indentified patent and that said Letters Patent is hereby corrected as shown below:

In column 14, line 33 of the patent, the equation should read as follows $$V_{bc}(t) \cong I_{bs}(R_s + R_r e^{-t/\tau} \qquad (42)$$

Signed and Sealed this

Second Day of July, 1996

BRUCE LEHMAN

*Attest:*

*Attesting Officer*   *Commissioner of Patents and Trademarks*